June 28, 1960 S. LEVIN 2,942,928

MAGNETOSTRICTIVE STORAGE APPARATUS

Filed July 31, 1953 2 Sheets-Sheet 1

Simon Levin
INVENTOR

June 28, 1960 S. LEVIN 2,942,928
MAGNETOSTRICTIVE STORAGE APPARATUS
Filed July 31, 1953 2 Sheets-Sheet 2

Simon Levin
INVENTOR

United States Patent Office 2,942,928
Patented June 28, 1960

2,942,928

MAGNETOSTRICTIVE STORAGE APPARATUS

Simon Levin, 123 W. 44th St., New York 36, N.Y.

Filed July 31, 1953, Ser. No. 371,606
22 Claims. (Cl. 346—74)

The invention relates to new and novel methods of and apparatus for impressing magnetic information in magnetic media having such forms, for example, as tapes, sheets, discs, cylinders, wire and the like.

In conventional methods of recording signals in a permanent magnet recording medium such as a tape or wire, the tape or wire is pulled at a constant speed past a stationary magnetic head which forms part of a magnetic circuit where it is subjected to a fluctuating magnetic field, the fluctuations being set up by the incoming signal. A magnetic record is thus impressed in the tape or wire. These methods are based on an inductive relationship between the magnetic head and the tape or wire and any incoming signal, whatever its origin, must be converted to a magnetic field to be recorded. Further, these methods are limited to one type of record in which the complexity of the information that may be recorded is contingent on the velocity at which the tape or wire is pulled past the recording head and the magnetic characteristics of the head, it being readily apparent that information involving frequencies higher than the range of sound will require high tape or wire velocities.

Occasions often arise when it is desirable to have magnetic records in tapes, sheets or other extended media of intricate designs or configurations representing waveforms, extended images and the like, but records of such a nature are not readily obtainable by conventional methods.

It is an object of the invention to provide methods of and apparatus for recording complex magnetic information in a manner dependent only in part on the velocity of the recording medium.

It is another object of the invention to provide methods of and apparatus for recording magnetic signals wherein the relationship between the impressing member and the recording medium is not necessarily inductive.

It is another object of the invention to provide methods of and apparatus for recording magnetic signals representative of mechanical displacements.

It is a further object of the invention to provide methods of and apparatus for recording magnetic signals which are representative of extended images.

It is another object of the invention to provide methods of and apparatus for recording magnetic signals representative of a wide band of information.

These and further objects of the invention will be more apparent from the following description, appended claims and the accompanying drawings wherein:

Figure 8 is a diagrammatic illustration of an apparatus in accordance with the invention with which magnetic records of configurations may be made in sheets, discs, or the like.

The magnetic properties of certain magnetic materials change with the application of stress to such an extent that stress may be considered of importance in affecting magnetic change. In some of these materials a stress will increase the ability to be magnetized by a large factor, in others the magnetization is decreased by stress. When magnetized, dimensional changes take place and such changes are referred to as magnetostriction. Correspondingly, a change in magnetic properties will take place with the application of stress.

The effect of stress is related to two classes of these materials having (1) a positive magnetostriction and (2) a negative magnetostriction. In materials like (1) the magnetization is increased by stress and in materials like (2) the magnetization is decreased by stress and, in general, this negative or positive behavior will be related to the structural orientation of the magnetostrictive material, as for example, the easy direction of magnetization.

Stresses may be applied simultaneously with the magnetizing field in a material which has a positive magnetostriction, thereby increasing the residual magnetism in relation to the stress; or stresses may be applied after the magnetizing field has been removed from a material having a negative magnetostriction whereby the residual magnetism is decreased by the stresses. A simultaneous application of stress and magnetizing field may be made also to a material which has a negative magnetostriction, the residual magnetism having thereby a lower value than the residual magnetism without stress. These materials, when subjected to a magnetic field in a manner as described above while coupled mechanically to the output of a transducer, may be successfully used to store a magnetic record of waves applied to the input of the transducer. During the application of the stress, the changes in structure which the magnetic material is caused to undergo also cause voltages to be developed across the material which vary in function of the stress.

In accordance with the invention a transducer is a device capable of being actuated by waves from one or more transmission systems or media and of supplying related waves to one or more other transmission systems or media. In this definition the term "wave" is a generic term intended to cover such concepts or ideas as, signal, power, energy, response, stimulus, current, voltage, motion, pressure and the like, whether these are constant or varying. The waves in the input may be of the same or different types, for example, electrical, mechanical, acoustical or other and in the present instance the output will be in the form of mechanical stress waves.

Figure 1:
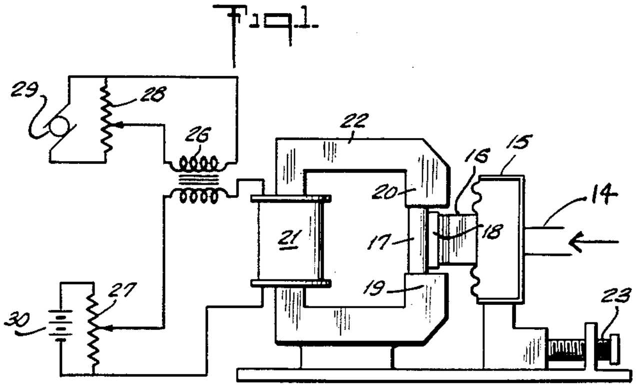
Figure 1 illustrates diagrammatically an embodiment of the invention wherein a tape or web is utilized in co-operation with a single transducer.
Figure 2:
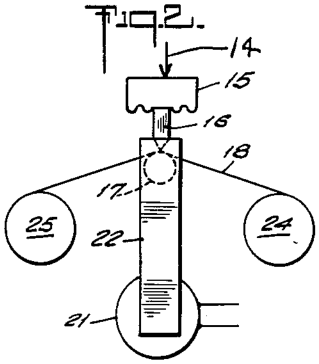
Figure 2 is a top view of Figure 1 showing in addition the reels for moving the tape.

Referring to Figure 1, as an example in accordance with the invention, reference character 22 indicates a ferromagnetic core 22 having wound thereon the coil 21 which is energized by a direct current supply 30 controlled by a potentiometer 27, and an alternating current supply 29, coupled to the coil 21 through the transformer 26 and a potentiometer 28. Between the pole 19 and the pole 20 of the core 22 is the anvil 17 over which a magnetostrictive recording tape 18 is transported in contact with the stylus 16 by the reel 24 and the reel 25 shown in Figure 2. A screw 23 permits the transducer 15 to be adjusted normally to the recording medium 18 so that a median operating stress between the anvil 17 and the stylus 16 may be applied.

In operation, the transducer 15 is actuated at its input 14 in any well known manner as for example, acoustically, electromagnetically, mechanically, electrostatically, or the like.

The magnetostrictive material of which recording tape 18 is constructed may be selected from a group of such materials that are well known to those skilled in the art, the selection being made in accordance with any preferred mode of operation of the apparatus shown in Figure 1. As an example, the recording tape 18 may be constructed to have a positive or negative magnetostriction. If positive, the potentiometer 27 is adjusted so that the direct current from the supply 30 flowing in the coil 21 produces a field between the pole 19 and the pole 20 that magnetizes the recording tape 18 to a value somewhat less than half the saturation point of the material of which it is constructed. An optimum field value is readily determined with a few trials. This field may also serve, in effect, as a polarizing field.

When waves are applied at the input 14 of the transducer 15, the stylus 16 stresses the recording tape 18 in relation to the waves and the residual magnetization of the portions of the recording tape 18 undergoing the stresses is therefore higher in relation to the stresses than the magnetization due to the steady field between the pole 19 and the pole 20. The value of the residual magnetism in the recording tape 18 may also be controlled to a certain extent with the screw 23 which sets the center or median stress about which the stresses applied by the stylus 16 vary. The signal to noise ratio and the percentage of modulation of the signal impressed in the recording tape 18 may be controlled by the value of the magnetizing field, the preferred adjustment being one where the stresses applied by the stylus 16 give the largest change in residual magnetism as compared to the magnetization of the recording tape 18 due to the field between the pole 19 and the pole 20 alone.

When a material having a negative magnetostriction is utilized in accordance with the invention, the field between the pole 19 and the pole 20 is adjusted to a value which brings the magnetization of tape 18 close to but somewhat below the point of saturation after a median stress has been applied with the stylus 16 by means of the adjustment screw 23. Waves are then applied to the input 14 of the transducer 15. The residual magnetism of those portions of the recording tape 18 undergoing the varying stresses from the stylus 16 is, in this mode of operation, lower in proportion to the stresses than the magnetization caused by the steady magnetizing field. Magnetic materials having a negative magnetostriction may also be utilized in accordance with the invention by being premagnetized and then stressed by the stylus 16, the residual magnetism being lowered in relation to the stresses.

Recording tape 18, in accordance with the invention, may be comprised of magnetostrictive metals or alloys such as, for example, an alloy of 65% cobalt, 5% vanadium and 30% iron, this alloy having a positive magnetostriction or an alloy of 29% nickel, 13% aluminum and 58% iron, this alloy having a negative magnetostriction.

Also, in accordance with the invention, recording tape 18 may be comprised of comminuted particles of magnetostrictive materials dispersed in a carrier material. Another favorable form in which the recording tape 18 may be constructed comprises comminuted particles of the magnetostrictive materials uniformly dispersed in and bonded with for example, resinous, cellulose or other plastic materials and coated on a carrier base such as cellulose acetate film or other suitable material, the comminuted particles being, for example, microscopic crystals of cobalt ferrite, nickel ferrite, ferrous ferrite or the like. By preorientation of these crystals within the binder, further control of the magnetization may be obtained. As, for example, an alignment of the crystals in the direction of the crystal axis most sensitive to the stress.

Figure 6:
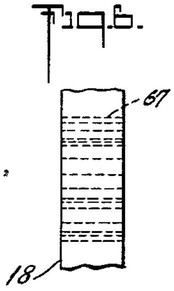
Figure 6 is a visualization of the type of magnetic record impressed by the apparatus shown in Figure 1.

In Figure 6 is a visualization of the magnetic signals impressed in the recording tape 18 by the stylus 16. In many respects this type of record resembles the variable density method of recording sound on photographic film.

Figure 3:
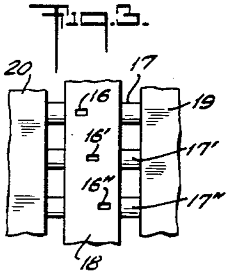
Figure 3 is a fragmentary view showing a plurality of styli tips positioned on the tape in a modification of the apparatus illustrated in Figure 1.
Figure 4:
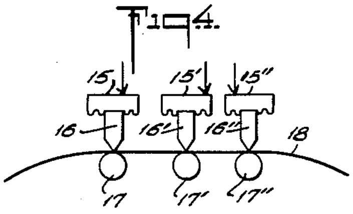
Figure 4 is a top view of Figure 3 showing in addition the transducer portions of the plurality of styli tips shown in Figure 3.

In Figure 3 is a modification of the apparatus illustrated in Figure 1 showing how a plurality of styli 16, 16', 16'' may be utilized in accordance with the invention to impress a plurality of record tracks on a single recording tape 18. Figure 4 is another view of the apparatus in Figure 3 showing the styli 16, 16', 16'' connected to the transducers 15, 15', 15''.

Figure 5:
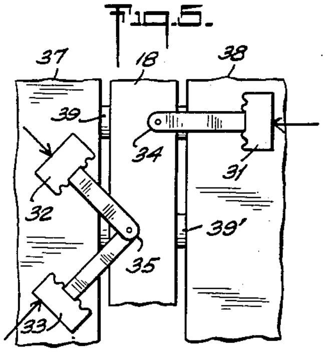
Figure 5 is a fragmentary view of another modification of Figure 1 showing the operation of transducers with pointed styli in accordance with the invention.
Figure 7:
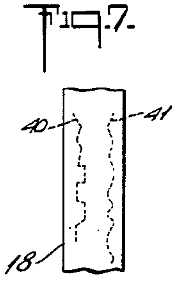
Figure 7 shows the type of magnetic trace made by the apparatus shown in Figure 5.

In Figure 5 is another modification of the apparatus shown in Figure 1, wherein the styli 34 and 35 of transducers 31, 32 and 33 have points with small radii and produce a record as visualized in Figure 7. The non-linear trace 40 is a type of record that may be produced by a complex movement represented by transducers 32 and 33, and linear trace 41 is a type of record produced, for example, by a sinusoidal movement represented by the transducer 31. The recording tape 18 is moved between the pole 37 and the pole 38 over the anvils 39 and 39', and the modes of operation are the same as those described for the apparatus shown in Figure 1.

In the foregoing a magnetostrictive tape has been used for illustrative purposes. With the proper shaping of the various anvils and styli, a magnetostrictive wire or a thread impregnated with magnetostrictive particles may be used in accordance with the invention.

Also in the foregoing the magnetizing field has been applied transverse to the recording tape 18 mainly for reasons of clarity. Magnetizing fields may be applied with any orientation, either in one direction and or any other direction.

By superimposing an alternating field upon the steady field between the pole 19 and the pole 20 by means of the alternating current supply 29 and control 28 in Figure 1, favorable control may be had over the operating characteristics of the magnetostrictive material utilized, such as the linearity, contrast and intensity of the residual field. The value and frequency may be readily determined for any mode of operation after a few trials.

Figure 8:
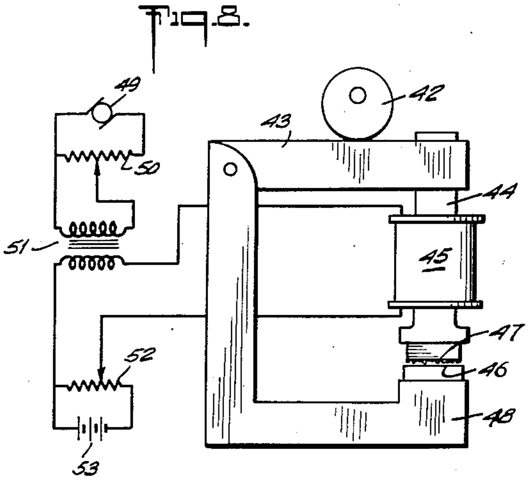

In Figure 8 is illustrated an apparatus with which magnetic information may be impressed in a sheet, disc or the like in accordance with the invention. Reference character 48 indicates a ferromagnetic core of which the arm 43 is adjustable by means of an eccentric 42. Attached to the arm 43 is a rod 44 having wound thereon a coil 45 energized from a direct current source 53 controlled by the potentiometer 52 and an alternating current source 49 controlled by the potentiometer 50 which is coupled to the coil 45 through transformer 51. Positioned between the rod 44 and the core 48 is a magnetostrictive recording medium 46 and a transducer plate 47 having formed thereon a raised pattern 66 (serving substantially like a group of transducers) which may have, for example, the configuration of intricate designs, waveforms, extended images and like configurations.

Figure 9:
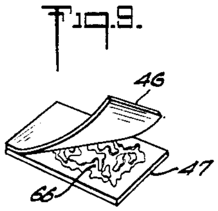
Figure 9 shows the positioning of a three dimensional transducer configuration with a magnetic medium constructed in accordance with the invention.
Figure 10:
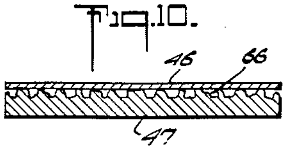
Figure 10 is a fragment of Figure 9 showing in detail the transducer configurations in contact with the magnetic medium.

In Figure 9 is shown the recording medium 46 partly lifted away from the transducer plate 47 showing a possible configuration of the raised pattern 66. Figure 10 indicates in detail a fragment of the transducer plate 47 showing the raised pattern 66 in contact with the recording medium 46.

In operation, the eccentric 42 is rotated so as to deflect the arm 43 thereby causing the transducer plate 47 to stress recording material 46 in proportion to the configurations of the raised pattern 66. The control 52 is adjusted to produce a field between the core 48 and the rod 44 of a value determined by the characteristics of the recording material 46 which may be constructed and utilized in a manner as described for the recording tape 18 in Figure 1. The optimum rotation of the eccentric 42, the period of stress and value of magnetizing field to produce a magnetic impression in the recording material 47 is readily ascertained with a few trials.

A more precise control over the magnetic characteristics of the recording material 47 and the magnetism impressed therein may be had by constructing the rod 44 of a magnetostrictive material such as an alloy of cobalt and iron having its maximum change of shape oriented along its length. By means of the control 50 an alternating current is applied to the coil 45 causing the length of the rod to increase and decrease with the current changes. In this mode of operation, the eccentric 42 is adjusted to form a median stress between the transducer plate 47 and the recording medium 46 about which the alternating stresses caused by the rod 44 vary, thereby providing, in effect a biasing stress. By proper adjustment of the condition of the flux in the magnetic circuit so as to synchronize with a desired change in length of the rod, for example, an increase in length at the same time as an increase in flux, there will result a large increase in the residual magnetism of the recording medium 46.

The transducer plate 47 may be constructed of metal, plastic, glass or any suitable material and may have the raised pattern 66 formed thereon by etching, molding, engraving and the like directly in the material or formed in coatings on the materials by methods utilized in the graphic arts such as photogelatine, collotype or like relief processes.

Figure 11:
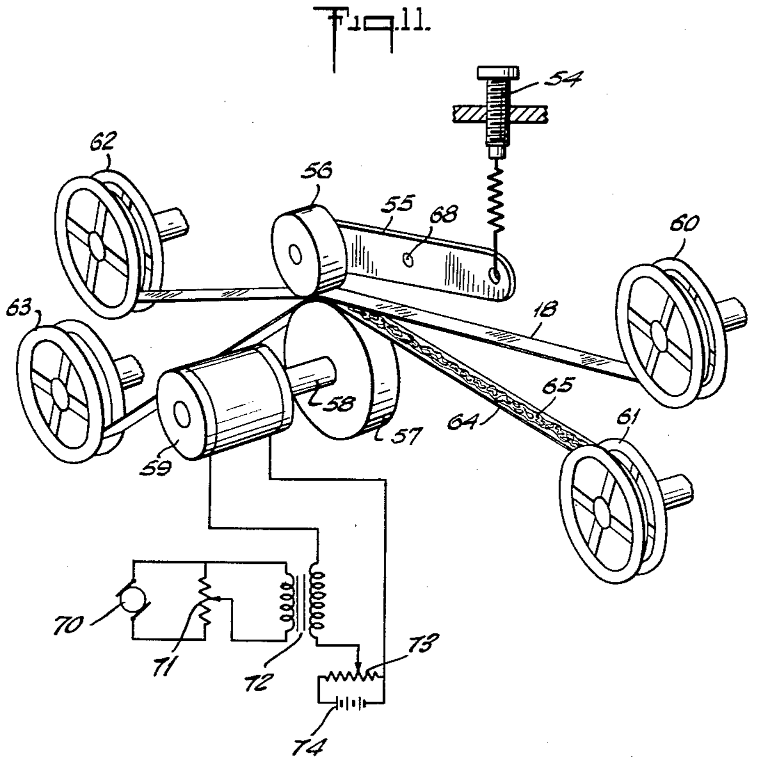
Figure 11 is a diagrammatic illustration showing a preferred embodiment of the invention wherein images of configurations are recorded on a magnetic tape.

In Figure 11 is shown an embodiment of the invention in which reference character 18 indicates the magnetostrictive recording tape being transported in contact with the raised pattern 65 of a transducer tape 64 by the reel 62 and the reel 60 which are coupled (by means not shown) to the reel 61 and the reel 63 in a manner to provide equal velocities between the recording tape 18 and the transducer tape 64 as they traverse a magnetizing pulley 57 and a stress pulley 56. The magnetizing pulley 57 is comprised of a material such as iron, Permalloy or the like and is energized by means of a shaft 58 made of like material serving as a core for the coil 59 which is energized from a direct current supply 74 adjustable by the control 73 and an alternating current supply 70 through the transformer 72 adjustable by the control 71. The stress pulley 56 is comprised of a magnetic material such as iron, Permalloy or the like and provides a low reluctance path for the magnetism from the magnetizing pulley 57 thus forming a field through which the recording tape 18 and the transducer tape 64 pass during the recording operation. The stress pulley 56, mounted on the arm 55 which is movable about the pivot 68, is adjustable by means of the screw 54.

To record a magnetic impression representative of the raised pattern 65, which may comprise configurations such as waveforms, designs, extended images and the like, the same modes of operation are utilized as has been described for the apparatus in Figure 1 and as determined by the characteristics of the magnetostrictive material utilized for the construction of the recording tape 18. The stresses applied by the stress pulley 26, however, are uniform and unidirectional in the same manner as described for the apparatus illustrated in Figure 8 when operated without the utilization of the magnetostrictive properties of the rod 44, the variations in stress that impress the magnetic image being generated by the raised pattern 65.

Superimposing an alternating field from the supply 70 upon the steady field furnished from the supply 74 permits control over the magnetic characteristics of the recording tape 18 although effective results are obtained by the use of only the steady magnetizing field.

The adjustment of the screw 54 for the recording operation is readily ascertained with a few trials.

Figure 12:
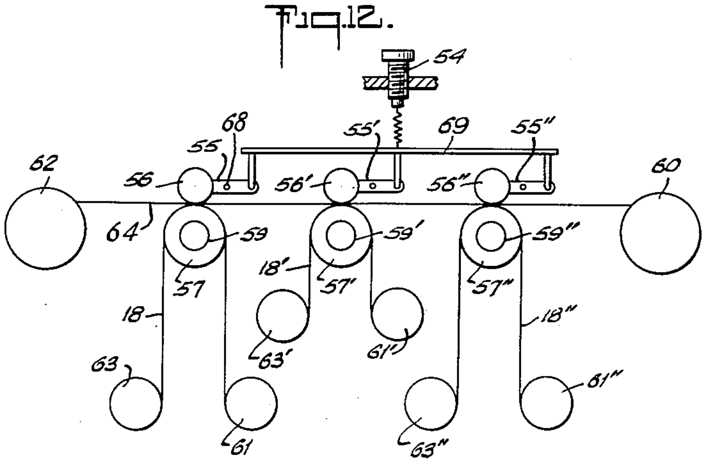
Figure 12 illustrates a modification of the preferred embodiment shown in Figure 11 wherein the images of configurations are recorded on a plurality of the magnetic tapes.

In Figure 12 is illustrated a modification of the apparatus shown in Figure 11 wherein the transducer tape 64, transported by the reel 62 and the reel 60, is utilized for impressing magnetic information in a plurality of recording tapes 18, 18′, 18″, the stressing pulleys 56, 56′, 56″ being coupled equally by means of the member 69 to the adjustment screw 54. Each stress pulley 56 may be adjusted individually in accordance with the invention. The coils 59, 59′, 59″ may be energized individually or collectively in the manner and by the means shown for the apparatus in Figure 11.

Generally, in the practice of the invention, the stresses applied to the magnetostrictive medium by the transducer, raised pattern or like means need not change the dimensions of the stressed regions by more than a few parts per million to produce a significant change in the magnetization of said stressed regions. It can be seen that suitable records of displacements in micron or fractional micron magnitudes may thus be easily obtained.

An expedient method that permits the adjustment of the magnetizing fields and the median stresses that may be applied to the magnetostrictive materials to be readily ascertained for the various modes of operation of the apparatus as described in the foregoing consists of applying a finely divided magnetic powder to the magnetostrictive recording material after a recording operation. A carbonyl iron powder of particle sizes averaging 2 to 5 microns, a fine screen gamma iron oxide or like materials are suitable for the purpose. These powders may be dusted directly on the specimen or may be suspended in a volatile fluid and applied to the specimen, the fluid evaporating quickly during which time the magnetic particles align themselves with the configurations of the magnetism impressed in the specimen, thus providing an accurate and visual indication of what has been recorded.

Certain embodiments of the invention have been set forth in the foregoing by way of illustration, and from these examples it will be readily apparent to those skilled in the art that many modifications may occur without departing from the true spirit and scope of the invention.

What is claimed is:

1. In a magnetic recording apparatus, an information carrier comprised of comminuted particles of magnetostrictive material within said carrier whereby said comminuted particles can be remanent changed by mechanical stresses which are representative of the information to be stored therein.

2. In a magnetic recording apparatus, an information carrier comprised of comminuted particles of magnetostrictive material which can be remanent changed by mechanical stresses representative of information to be stored therein, said comminuted particles in a binder coated on a base member, said binder being of the type adapted to constrain said comminuted particles which are remanent changed by said mechanical stresses whereby the effect of said mechanical stresses is retained after said mechanical stresses are removed.

3. In a magnetic recording apparatus, an information carrier comprised of comminuted particles of magnetostrictive material which can be remanent changed by mechanical stresses representative of information to be stored therein, said comminuted particles adapted to be positioned in a manner whereby said remanence may be controlled by the orientation of the mechanically stress sensitive axis of said comminuted particles relative to said mechanical stresses.

4. An apparatus for recording magnetic information which comprises a magnetostrictive medium, means for magnetizing said medium and means for subjecting said medium to mechanical stresses which are representative of information to be stored within said medium.

5. An apparatus for recording magnetic information as claimed in claim 4 wherein said magnetostrictive medium comprises a permanent magnet type material.

6. An apparatus for recording magnetic information as claimed in claim 4 wherein said means for magnetizing said magnetostrictive medium comprises a unidirectional varying magnetic field.

7. An apparatus for recording magnetic information which comprises a physically stress sensitive magnetic medium, means for polarizing said medium, means for positioning said medium in contact with a transducer means and means for transporting said medium with respect to said transducer means, said transducer means adapted for physically stressing said recording medium in accordance with information to be recorded.

8. An apparatus for recording magnetic information as claimed in claim 7 wherein there is included a plurality of said transducer means.

9. An apparatus for storing magnetic information which comprises a first magnetostrictive medium, means for magnetizing said first medium, a second medium having areas thereof at levels different from levels of other areas thereof, said areas representing information to be recorded; and means for stressing said first medium with said areas of said second medium whereby a magnetic replica of said areas is impressed in said first medium.

10. An apparatus for recording magnetic information which comprises a first magnetostrictive medium, means for polarizing said first medium to a predetermined remanence, a second medium having areas thereof at levels different from levels of other areas thereof, said areas representing information to be recorded; and means for stressing said first medium with said areas of said second medium whereby said remanence of said first medium is changed as a function of the stresses of said areas.

11. An apparatus for recording magnetic information which comprises a first magnetostrictive recording medium, means for magnetizing said first magnetostrictive recording medium, a second medium having areas thereof at levels different from levels of other areas thereof, said areas representing information to be recorded; and a second magnetostrictive means adapted for stressing said first magnetostrictive medium with said areas of said second medium whereby a magnetic replica of said areas is impressed in said first magnetostrictive medium.

12. An apparatus for recording magnetic information which comprises a first magnetostrictive recording medium, a second medium having areas thereof at levels different from levels of other areas thereof, said areas representing information to be recorded, means for placing said areas in contact with said first recording medium, means for magnetically conditioning said first medium; and means for transporting said first medium and said second medium cooperative with means for stressing said first recording medium with said areas of said second medium.

13. An apparatus for recording magnetic information which comprises a first magnetostrictive medium, a second medium, means for producing a raised pattern in said second medium, said raised pattern comprising information to be recorded, means for magnetizing said first magnetostrictive medium and means for stressing said first magnetostrictive medium with said raised pattern.

14. An apparatus for recording magnetic information which comprises a first magnetostrictive medium, a second medium, means for producing a raised pattern in said second medium, said raised pattern comprising information to be recorded, means for polarizing said magnetostrictive medium to a predetermined remanence; and means for stressing said first magnetostrictive medium with said raised pattern whereby said remanence is changed as a function of the stresses of said raised pattern.

15. An apparatus for recording magnetic information which comprises a first magnetostrictive medium, a second medium having a raised pattern representative of information to be recorded, positioning means for placing said first medium in contact with said raised pattern, said positioning means adapted to stress said first medium with said raised pattern, said positioning means adapted to apply a magnetic field to said first medium and said second medium; and means for transporting said first medium and said second medium with respect to said positioning means.

16. An apparatus for recording magnetic information which comprises a plurality of first magnetostrictive recording mediums, a second medium having a raised pattern representative of information to be recorded, means for placing said plurality of first mediums in contact with said raised pattern, means for moving said plurality of first mediums and said second medium in cooperation with means for stressing said plurality of first mediums with said raised pattern simultaneously with the application of means for magnetizing said plurality of first mediums.

17. An apparatus for recording magnetic information as claimed in claim 16 wherein said magnetizing means is applied to said plurality of first magnetostrictive mediums and said second medium.

18. An apparatus for storing magnetic information which comprises a magnetostrictive medium, means for magnetizing said medium, means for subjecting said medium to mechanical stresses which are representative of information to be stored within said medium; and means for subjecting said medium to finely divided magnetic powder means subsequent to the application of said mechanical stresses to said medium, thereby providing a visual indication of the information stored within said medium.

19. An apparatus for recording magnetic information which comprises a magnetostrictive medium, means for magnetizing said medium, said magnetizing means comprising a constant magnetic field, and means for subjecting said medium to mechanical stresses which are representative of information to be stored within said medium.

20. An apparatus for recording magnetic information which comprises a magnetostrictive medium, means for magnetizing said medium, said magnetizing means comprising a varying magnetic field; and means for subjecting said medium to mechanical stresses which are representative of information to be stored within said medium.

21. An apparatus for recording magnetic information which comprises a magnetostrictive medium, means for magnetizing said medium, means for subjecting said medium to mechanical stresses which are representative of information to be stored within said medium; and means for applying said magnetizing means prior to the application of said means for subjecting said magnetostrictive medium to said mechanical stresses.

22. An apparatus for recording magnetic information which comprises a magnetostrictive medium, means for magnetizing said medium, means for subjecting said medium to mechanical stresses which are representative of information to be stored within said medium; and means for applying said magnetizing means simultaneously with the application of said means for subjecting said magnetostrictive medium to said mechanical stresses.

References Cited in the file of this patent

UNITED STATES PATENTS

| | | |
|---|---|---|
| 2,501,126 | Howell | Mar. 21, 1950 |
| 2,511,121 | Murphy | June 13, 1950 |
| 2,536,029 | Camras | Jan. 2, 1951 |
| 2,561,476 | Lang | July 24, 1951 |
| 2,587,593 | Camras | Mar. 4, 1952 |
| 2,674,660 | Ambrose | Apr. 6, 1954 |
| 2,723,315 | Howell | Nov. 8, 1955 |
| 2,747,026 | Camras | May 22, 1956 |
| 2,747,027 | Camras | May 22, 1956 |

FOREIGN PATENTS

| | | |
|---|---|---|
| 666,653 | Great Britain | Feb. 13, 1952 |

OTHER REFERENCES

Ferromagnetography, G.E. Review, pgs. 20–22 and 61.

Radio Craft, November 1946 edition, pages 16 and 65, article by R. F. Scott.